United States Patent [19]
Clark et al.

[11] 3,939,551
[45] Feb. 24, 1976

[54] METHOD OF MAKING POLYTETRAFLUOROETHYLENE SEALING ELEMENTS WITH HYDRODYNAMIC ACTION

[75] Inventors: William E. Clark, Chelsea, Mich.; John David Butler, Van Wert, Ohio

[73] Assignee: Federal-Mogul Corporation, Southfield, Mich.

[22] Filed: Feb. 4, 1975

[21] Appl. No.: 546,882

[52] U.S. Cl. .............. 29/417; 29/511; 29/DIG. 15; 29/DIG. 34; 264/159; 264/163; 264/293; 264/296
[51] Int. Cl.² .................................. B23P 17/00
[58] Field of Search ........ 29/417, 511, 148.45, 557, 29/558, 200 B, DIG. 3, DIG. 15, DIG. 34; 264/159, 154, 295, 162, 163, 293, 296, 320; 277/184

[56] References Cited
UNITED STATES PATENTS

| | | | |
|---|---|---|---|
| 1,936,804 | 11/1933 | Stein | 29/DIG. 34 X |
| 3,004,297 | 10/1961 | Stover | 264/163 |
| 3,032,825 | 5/1962 | Proud | 264/159 |
| 3,137,935 | 6/1964 | Gachot | 29/450 |
| 3,207,826 | 9/1965 | Yost | 264/320 X |
| 3,268,984 | 8/1966 | Kupchick | 277/184 X |
| 3,549,445 | 12/1970 | McMahon | 29/445 X |
| 3,857,156 | 12/1974 | Clark | 264/295 X |

*Primary Examiner*—Victor A. DiPalma
*Attorney, Agent, or Firm*—Owen, Wickersham & Erickson

[57] ABSTRACT

A method for manufacturing an oil seal element from polytetrafluoroethylene and the like. A tubular billet of polytetrafluoroethylene or the like is provided with an outer cylindrical surface of the desired diameter and an inner cylindrical surface approximating but slightly smaller than the desired diameter, and an end wall is faced off perpendicular to the cylindrical surfaces. A series of washers of a desired thickness is then sliced from the billet. The flat washer is then first assembled with a metal case and then a desired hydrodynamic shape, such as a spiral groove, is coined in. Preferably, the inner pierce is completed at this time. Each washer may then be formed under pressure to permanently deform the radially inner portion thereof to a frustoconical shape. The assembled seal may be held on a shaft-size mandrel during application of a coating to the metal case.

15 Claims, 7 Drawing Figures

METHOD OF MAKING POLYTETRAFLUOROETHYLENE SEALING ELEMENTS WITH HYDRODYNAMIC ACTION

BACKGROUND OF THE INVENTION

This invention relates to the manufacture of hydrodynamic seals from polytetrafluoroethylene and the like.

Polytetrafluoroethylene is a material which is not readily molded, as are the various synthetic rubbers, but which has some very desirable characteristics. In some uses, its ability to withstand high temperatures recommends its use as the oil sealing element which is in rotary contact with the shaft, instead of using one of the less temperature resistant synthetic rubbers. There are also other uses where this material would be advantageous, but heretofore its use has been greatly limited by its inability to be molded to desired shapes in an efficient manner. Normally, it is sliced into a thin washer-like member rather than being molded into any desired shape. Therefore, it is expensive to manufacture, and this expense has greatly limited its use.

The difficulty of molding this material has also made it impractical heretofore to make a hydrodynamic seal from polytetrafluoroethylene. Hydrodynamic seals, when made from conventional elastomers, such as nitriles, have conventionally been made by molding a spiral groove or other hydrodynamic structure into the molded element, but such molding of polytetrafluoroethylene has been economically, at least, unfeasible.

SUMMARY OF THE INVENTION

In the present invention an oil seal element is made from polytetrafluoroethylene or like materials by first providing a tubular billet of the polytetrafluoroethylene or other material. This billet may be manufactured so as to have a desired size of inner and outer cylindrical surfaces, and since these may be somewhat rough, a face perpendicular to these two surfaces is then prepared by a facing-off operation, and then a series of slices of a desired thickness are cut off to make a series of washers of the polytetrafluoroethylene, all having roughly the desired dimensions.

The washer is given its final outer periphery, preferably by machining the billet exactly to the desired outer periphery before slicing the washers, or else by post-trimming. Then the washer is usually assembled between its metal case elements, and, after that, the seal assembly is placed in a die, and the inner pierce is made to exact size. Simultaneously, or immediately after piercing a desired hydrodynamic shape is coined into one surface of the washer under very high press load. (However, the piercing may be done before assembly or the billet may be machined to the desired inner periphery.) Then, the frustoconical shape is imparted to the washer. The preferred method of this invention with the steps in the order of blanking, assembling, piercing, and coining, has the advantage of improving the concentricity of the inner pierce and the frustoconical shape to the bore-engaging portion of the case; however, absolute concentricity is not always necessary, and then the order of steps is not critical.

Finally, the seal assembly may then be installed on a mandrel of substantially the same diameter as the shaft for which the seal is intended and a coating applied to the outer periphery of the case, to improve its bore-sealing properties (See U.S. Pat. Nos. 2,889,163 and 3,275,332.) This coating application is done at an elevated temperature, and the mandrel maintains the desired frustoconical shape. Such a mandrel may, if desired, be used when shipping the seal also.

Other objects and advantages of the invention will appear from the drawings and the description which follows.

DETAILED DESCRIPTION OF SOME PREFERRED FORMS OF THE INVENTION

Figure 1:
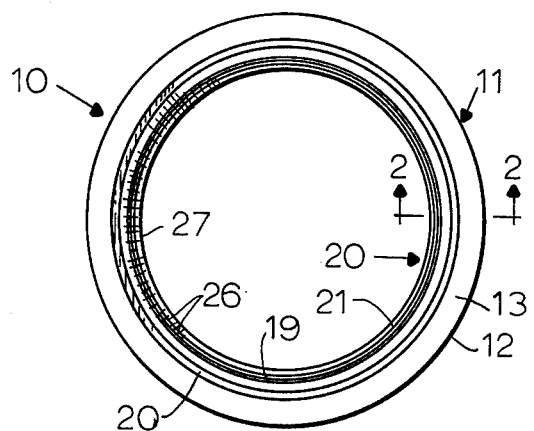
FIG. 1 is a view in end elevation of a radial-type shaft seal embodying the principles of the invention.
Figure 2:
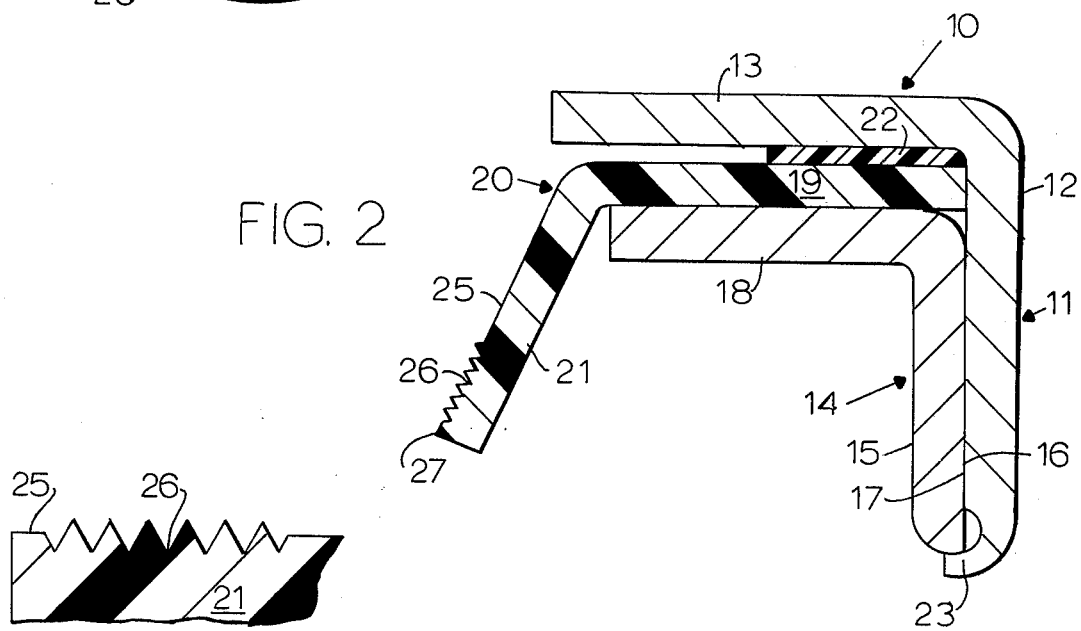
FIG. 2 is an enlarged view in section taken through the seal along the line 2—2 in FIG. 1.

A typical product of the invention, the seal 10:

FIG. 1 shows a completed radial shaft 10 embodying the principles of the invention, while FIG. 2 shows an enlarged cross-section of this radial shaft seal 10. The seal 10 has an outer case 11 with a cylindrical portion 12 and a radial flange 13. There is also an inner case 14 with a cylindrical portion 15 which nests in the cylindrical portion 12, so that the outer surface 16 of the portion 15 directly bears against the inner cylindrical wall 17 of the portion 12. The inner case 14 also has a radial flange 18. Between the radial flanges 13 and 18 is a flat radial outer portion 19 of a seal element 20, preferably made from polytetrafluoroethylene, and which also has a frustoconical portion 21. A gasket 22 is preferably provided between the polytetrafluoroethylene seal element 20 and the radial wall 13, to insure sealing between the seal element 20 and the case 11. The radial flange 18 of the inner case 14 is forced toward the radial flange 13 of the outer case 11, so that the wall 18 compresses the portion 19 and holds it tightly and compresses the gasket 22 to prevent leakage and holds the element 20 securely in the case and then the outer case 11 has an end portion 23 curled over to lock the inner case 14 tightly in that position. This general construction is, of course, well known.

The inner portion 21 of the polytetrafluoroethylene element 20 is frustoconical in shape and is provided with an air-side surface 25 having a spiral groove 26 leading outwardly from the innermost edge 27 of the seal. This groove 26 is made so that during rotation of the shaft in a particular direction, the groove tends to return any oil which may leak along the shaft, due to scratches in the shaft or minor imperfections in the shaft or even in the shaft sealing element itself, though most of the leakage occurs in this instance from the shaft imperfections. As in all hydrodynamic seals, the purpose of the groove 26 is to return the oil beneath the innermost edge 27 and back to the oil side of the seal. Other hydrodynamic shapes may be applied as desired in place of a spiral groove. Practically any shape enabling hydrodynamic action may be applied to the element 20 by employing the present invention.

When the seal 10 is installed, there is shaft interference which flexes the inner portion 21 and makes a portion thereof substantially cylindrical for a short distance; that is why the spiral groove 26 (or other hydrodynamic shaped portion) extends a substantial distance along the face, because the degree of shaft interference is somewhat indeterminate.

Manufacture by the method of FIGS. 4–7:

The manufacture of the seal element 20 begins by making a billet 30 of polytetrafluoroethylene having an outer periphery 31 and having an inner periphery 32. Preferably, the outer diameter is made exactly to size; it may be made somewhat oversize and trimmed. In either event, the inner diameter is made somewhat undersize; subsequent piercing will provide exactly the dimension required.

The end wall, if it is not exactly perpendicular to the axis of the billet 30, is faced off to provide a faced wall 33 that is exactly perpendicular. The next step employs a lathe tool 34 to slice a series of washers 35 of the desired thickness. Each slicing also simultaneously faces the billet 30 so that it is flat and ready for the next slice. This slicing operation is continued until the desired number of washers 35 are then produced or the billet 30 is consumed. The washers 35 themselves are not perfectly flat as cut but assume somewhat of a curved shape.

The next step is to assemble the washer 35 into the case structure, with the washer in between the case elements 11 and 14, the gasket 22 being in place. A die may be used having two flat surfaces, one of which engages the radial flange 13 of the case member 11, while the other engages the radial flange 18 of the case member 14. The portion 19 of the element 20 and the gasket 22 lie in between the case flanges 13 and 18. The washer 35, as assembled, is flat and has no hydrodynamic groove, rib, flute or the like.

Figure 5:
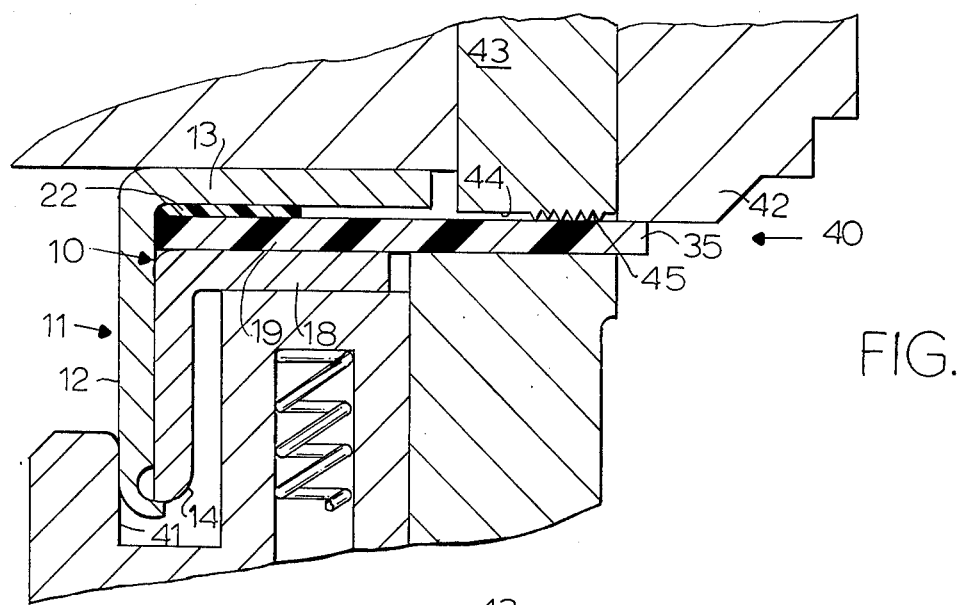
FIG. 5 is a view in elevation and in section of a sliced washer that has been assembled into a case, in accordance with the principles of the invention, placed in a press and about to be subjected to a coining operation at that time to form the hydrodynamic groove.
Figure 6:
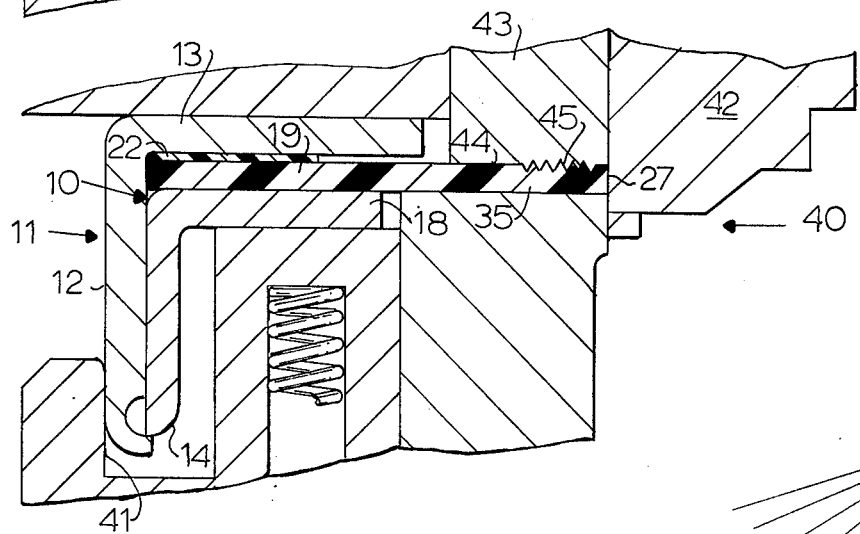
FIG. 6 is a view similar to FIG. 5 with the press closed and the coining being done and the inner periphery being pierced to its final dimensions.

Now the assembly with the flat washer 35 is placed in a forming die 40 like that shown in FIG. 5. This die 40 has a recess provided by an annular wall 41 for receiving the outer case 11 and closely following its outer periphery 12, in order to insure concentricity between the washer 35 (which in its final assembled form is referred to as the seal element 20) and the cylindrical case wall 12 that will later engage the bore wall in an installation of the seal.

Figure 3:
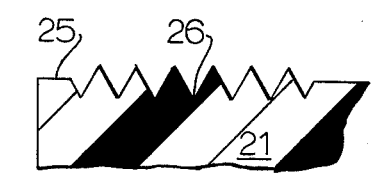
FIG. 3 is an enlarged view of a portion of the inner frustoconical lip of the polytetrafluoroethylene element of FIG. 2.
Figure 4:
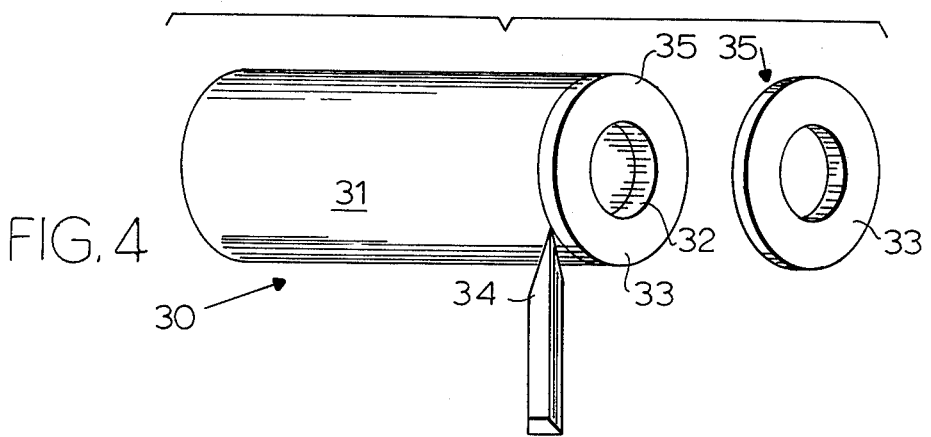
FIG. 4 is a view in perspective of a billet being machined and sliced to provide a series of washers of polytetrafluoroethylene.

In the die, the inner pierce may be made, by a piercing element 42 of the die 40, cutting the inner edge of the washer 35 exactly to the desired dimension, concentricity being assured by the concentricity of the piercing element 42 relative to the wall 41, so that the concentricity of the inner edge 27 relative to the wall 12 is assured. In the die 40 one of the die members 43 is provided with a flat portion 44 that overlies and grips an annular portion of the washer 35 while a coining portion 45 forms the hydrodynamic shape (a spiral groove or whatever). Many tons of pressure are exerted on the washer 35, forcing the spiral thread into its surface and forming on the washer's surface the hydrodynamic groove 26. The exact amount of pressure required may vary with the dimensional specifications of the washer 35, as will be obvious to one of ordinary skill in the art. It is important, however, that sufficient pressure be applied to cause permanent deformation of the washer in the area of the hydrodynamic grooves so that the possibility of material recovery is substantially eliminated. This completes formation of the washer 35 into the pierced-to-size and coined seal element 20, referred to in FIGS. 1–3. However, after the operation of FIG. 6, a frustoconical shape may be imparted, as by appropriate die apparatus, should such preforming be considered desirable for a particular seal application.

Figure 7:
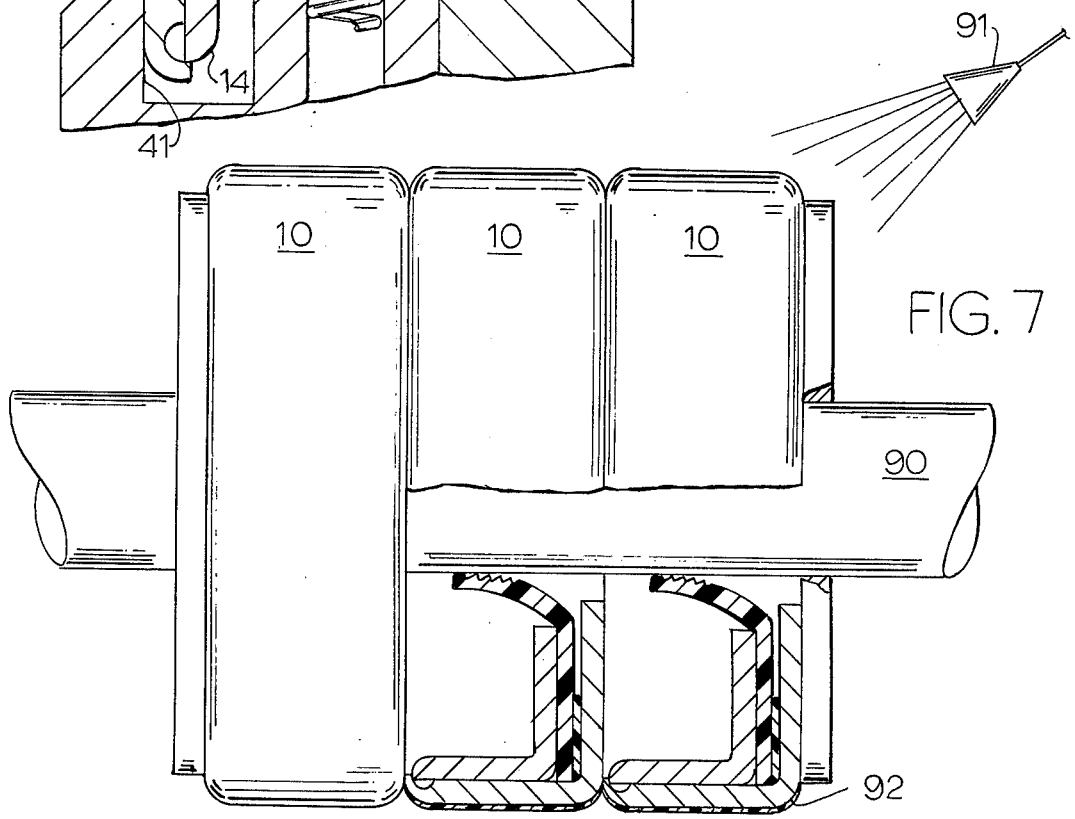
FIG. 7 is a view in elevation and partly in section of a series of assembled seals being supported on a mandrel for application of a coating to the outer case walls.

Often, it is desirable to provide the case wall 12 with a coating to improve sealing in the bore on installation. The application of such coatings and the evaporation of solvent therefrom involves elevated temperatures. To protect the sealing elements from receiving the coating and to prevent the memory of the polytetrafluoroethylene from causing loss of the frustoconical shape, it is desirable to employ a mandrel 90, as shown in FIG. 7. The mandrel 90 is the same size, substantially, as the shafts on which the seals 10 are to be installed. A series of seals 10 are placed on the mandrel 90, giving the desired shaft interference with the elements 20, the seals 10 abutting each other and a protecting washer applied at each end. The assembly may then be sprayed from a nozzle 91 to provide a coating 92 and the rise in temperature during application of the coating and evaporation of the coating's solvent therefrom, does not affect the frustoconical shape of the element 20 because of the shaft interference action of the mandrel retaining the desired frustoconical shape of the element 20. If desired, the mandrel 90 may be used for shipping and storing the seals 10.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method for manufacturing an oil seal having an element made from a disc-like flat washer of polytetrafluoroethylene or the like having an outer circular rim and a generally concentric inner circular rim, comprising the steps of:
   assembling the washer into a metal case between an outer case member having a cylindrical wall and an inner case member, and
   then coining one face of each said washer to provide, adjacent said inner rim, hydrodynamic means for returning oil.

2. The method of claim 1 wherein after said coining step there is the additional step of forming a radially inner portion of said washer to a frustoconical shape, leaving a radially outer portion that is planar and is held so between said inner and outer case members.

3. A method for manufacturing an oil seal having an element made from a disc-like flat washer of polytetrafluoroethylene or the like having an outer circular rim and a generally concentric inner circular rim, comprising the steps of:
   assembling the washer into a metal case between an outer case member having a cylindrical wall and an inner case member,
   piercing said washer to provide a desired inner periphery, and coining one face of each said washer to provide, adjacent said inner rim, hydrodynamic means for returning oil.

4. A method for manufacturing an oil seal having an element made from a disc-like flat washer of polytetrafluoroethylene or the like having an outer circular rim and a generally concentric inner circular rim, comprising the steps of:

assembling the washer into a metal case between an outer case member having a cylindrical wall and an inner case member, then coining one face of each said washer to provide, adjacent said inner rim, hydrodynamic means for returning oil, and then piercing said coined washer to provide a desired inner periphery while assuring concentricity of said inner periphery with the cylindrical wall of said outer case, said piercing and coining steps cooperating to cause said hydrodynamic means to be properly located relative to said inner periphery.

5. The method of claim 4 wherein said coining and piercing steps are done in one continuous stroke.

6. The method of claim 4 wherein after said coining step there is the additional step of forming a radially inner portion of said washer to a frustoconical shape, leaving a radially outer portion that is planar and is held so between said inner and outer case members.

7. The method of claim 6 wherein after the step of forming said frustoconical shape, the assembled seal is mounted on a cylindrical mandrel larger in diameter than said pierce, and while supported thereon, coating an outer peripheral wall of said outer case at an elevated temperature, with a bore-retention coating, said supporting of said seal on said mandrel preventing relaxation of said frustoconical shape by the heat.

8. A method for manufacturing an oil seal having an outer case of metal with a cylindrical radially outer wall for engaging a bore, a resilient washer-like element of polytetrafluoroethylene, and an inner metal case clamping said washer-like element to said outer case, comprising:

machining a tubular billet of polytetrafluoroethylene to provide a cylindrical outer periphery of desired final dimensions, then facing off one end of said billet perpendicular to the cylinder of the outer periphery, then slicing said billet at a desired thin distance from said faced end wall to provide a washer and leaving a newly faced end wall, then continuing to slice said billet to provide a series of washers, all said washers being the same thickness, then assembling each said washer into a case by clamping it between said inner case and said outer case, then coining one face of each said washer under severe pressure to form permanent hydrodynamic means for returning leaked fluid, and piercing said coined washer to provide a desired inner periphery while assuring concentricity of said inner periphery with cylindrical wall of said outer case.

said piercing and coining steps cooperating to cause said hydrodynamic means to be properly located relative to said inner periphery.

9. The method of claim 8 having the additional step after said coining and piercing of forming each said washer under pressure to deform the radially inner portion thereof permanently to a frustoconical shape, leaving an outer annular rim that is planar.

10. A method for manufacturing an oil seal having an outer case of metal with a cylindrical radially outer wall for engaging a bore, a resilient washer-like element of polytetrafluoroethylene, and an inner metal case clamping said washer-like element to said outer case, comprising:

machining a tubular billet of polytetrafluoroethylene to provide a cylindrical tube of desired dimensions, then facing off one end wall of said billet perpendicular to the cylinder of the outer periphery, then slicing said billet at a desired thin distance from said faced end wall to provide a washer and leaving a newly faced end wall, then continuing to slice said billet to provide a series of said washers, all said washers being the same size, then assembling each said washer into a case by clamping it between said inner case and said outer case, and then coining one face of each said washer under severe pressure to form permanent hydrodynamic means for returning leaked fluid.

11. The method of claim 10 having the additional step after said coining of forming each said washer under pressure to deform the radially inner portion thereof permanently to a frustoconical shape, leaving an outer annular rim that is planar.

12. A method for manufacturing an hydrodynamic oil seal incorporating a sealing element clamped between an inner case and an outer case having a cylindrical bore-engageable wall, said sealing element being made from a generally flat washer of polytetrafluoroethylene or the like, comprising the steps of:

clamping said washer between said inner and outer cases, and then coining one face of each said washer to provide hydrodynamic means for returning leaked fluid.

13. The method of claim 12 having the additional step after said coining of forming each said washer under pressure to deform the radially inner portion thereof to a frustoconical shape, leaving an outer annular rim that is planar.

14. A method for manufacturing an hydrodynamic oil seal incorporating a sealing element clamped between an inner case and an outer case having a cylindrical bore-engageable wall, said sealing element being made from a generally flat washer of polytetrafluoroethylene or the like, and having an outer periphery of final desired size and an undersized inner periphery, comprising the steps of:

clamping said washer between said inner and outer cases, then coining one face of each said washer to provide hydrodynamic means for returning leaked fluid, and piercing said washer to provide the desired inner periphery concentric with said cylindrical wall, said coining and piercing cooperating so that said hydrodynamic means leads from said inner periphery and extends for a desired width.

15. The method of claim 7 having the additional step after said coining and piercing, of forming each said washer under pressure to deform the radially inner portion thereof to a frustoconical shape, leaving an outer annular rim that is planar.

* * * * *

UNITED STATES PATENT AND TRADEMARK OFFICE
CERTIFICATE OF CORRECTION

PATENT NO. : 3,939,551
DATED : February 24, 1976
INVENTOR(S) : William E. Clark and John David Butler It is certified that error appears in the above-identified patent and that said Letters Patent are hereby corrected as shown below:

Column 2, line 35, "shaft 10" should read --shaft seal 10--.

Column 5, line 46, which is line 10 of claim 8, "one end" should read --one end wall--.

Signed and Sealed this twenty-second Day of June 1976

[SEAL]

Attest:

RUTH C. MASON
Attesting Officer

C. MARSHALL DANN
Commissioner of Patents and Trademarks